(12) United States Patent
Liu

(10) Patent No.: US 6,339,884 B1
(45) Date of Patent: Jan. 22, 2002

(54) STRUCTURE OF SCISSORS FOR CUTTING GRASS

(76) Inventor: Chin-Chou Liu, P. O. Box 82-144, Taipei (TW)

( * ) Notice: Subject to any disclaimer, the term of this patent is extended or adjusted under 35 U.S.C. 154(b) by 0 days.

(21) Appl. No.: 09/621,957

(22) Filed: Jul. 21, 2000

(51) Int. Cl.7 .................................................. B26B 13/28
(52) U.S. Cl. ............................. 30/248; 30/257; 30/262
(58) Field of Search ........................ 30/249, 250, 254, 30/257, 259, 261, 262, 248

(56) References Cited

U.S. PATENT DOCUMENTS

| | | | |
|---|---|---|---|
| 1,941,718 A | * 1/1934 | Rasmussen | 30/248 |
| 2,306,506 A | * 12/1942 | Simonsen et al. | 30/248 |
| 2,964,846 A | * 12/1960 | Steede | 30/262 |
| 3,339,281 A | * 9/1967 | Chow | 30/262 |
| 4,069,584 A | * 1/1978 | Germain | 30/248 |
| 4,739,556 A | * 4/1988 | Orthey | 30/248 |

* cited by examiner

Primary Examiner—Hwei-Slu Payer
(74) Attorney, Agent, or Firm—A & J

(57) ABSTRACT

Scissors for cutting grass includes a head having an end formed with an opening having a plurality of internal teeth, a main body provided with a cylindrical member having a neck at an intermediate portion and a geared portion at an inner portion, the main body being engaged with the head with the cylindrical member fitted into the opening, a handle pivotally connected with the main body, a positioning member inserted between the head and the main body, a linking wire having an end inserted through the cylindrical member to connect with the handle, a movable blade having an end connected with another end of the linking wire, and a stationary blade pivotally connected with the movable blade and mounted on a bottom of the head by screws.

2 Claims, 4 Drawing Sheets

STRUCTURE OF SCISSORS FOR CUTTING GRASS

BACKGROUND OF THE INVENTION

1. Field of the Invention

This invention is related to an improvement in the structure of scissors for cutting grass.

2. Description of the Prior Art

Referring to FIGS. 4 and 5, the conventional scissors for cutting grass includes a head 30 provided with a protruded tubular member 31 at one end thereof. The tubular member 31 has an enlarged conical outer end 32 forced into a hole at an inner end of a main body 40. An end of a linking wire 33 extends through the tubular member 31 into the head 30 to connect with a movable blade 34, while the other end of the linking wire 33 extends through the main body 40 to connect with a handle 43, so that one may move the handle 43 to control the operation of the movable blade. A stationary blade 35 is permanently fixedly mounted on the bottom of the head 30. Nevertheless, as the enlarged conical end 32 of the tubular member 31 is forced into the main body 40, it will be impossible to dismantle the scissors for maintenance once assembled. Hence, even if the blades are blunt or broken, it is impossible to replace them with new ones, so that once there is something wrong with the scissors no matter whether the blades can still be used or not, the scissors will be discarded thereby wasting money and natural resources. In addition, when the scissors are not correctly assembled in manufacture, the enlarged conical end 32 of the scissors must be broken in order to disengage the head 30 from the main body 40 thus increasing the manufacturing cost.

Therefore, it is an object of the present invention to provide an improvement in the structure of scissors for cutting grass which can obviate and mitigate the above-mentioned drawbacks.

SUMMARY OF THE INVENTION

This invention is related to an improvement in the structure of scissors for cutting grass.

It is the primary object of the present invention to provide an improvement in the structure of scissors for cutting grass which can be disassembled as required.

It is another object of the present invention to provide an improvement in the structure of scissors for cutting grass the blades of which can be replaced as required.

According to a preferred embodiment of the present invention, scissors for cutting grass includes a head having an end formed with an opening having a plurality of internal teeth, a main body provided with a cylindrical member having a neck at an intermediate portion and a geared portion at an inner portion, the main body being engaged with the head with the cylindrical member fitted into the opening, a handle pivotally connected with the main body, a positioning member inserted between the head and the main body, a linking wire having an end inserted through the cylindrical member to connect with the handle, a movable blade having an end connected with another end of the linking wire, and a stationary blade pivotally connected with the movable blade and mounted on a bottom of the head by screws.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
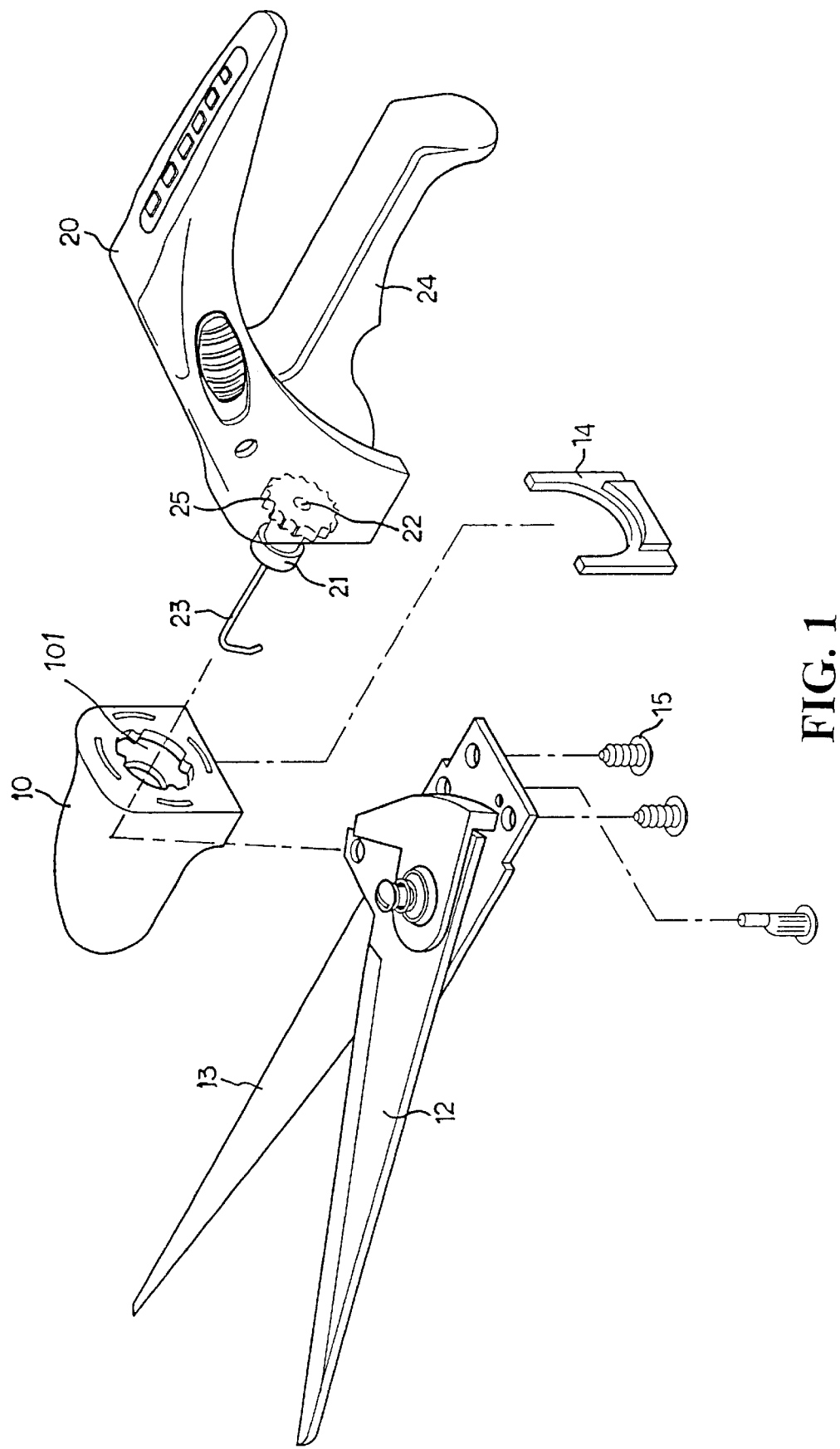
FIG. 1 is an exploded view of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
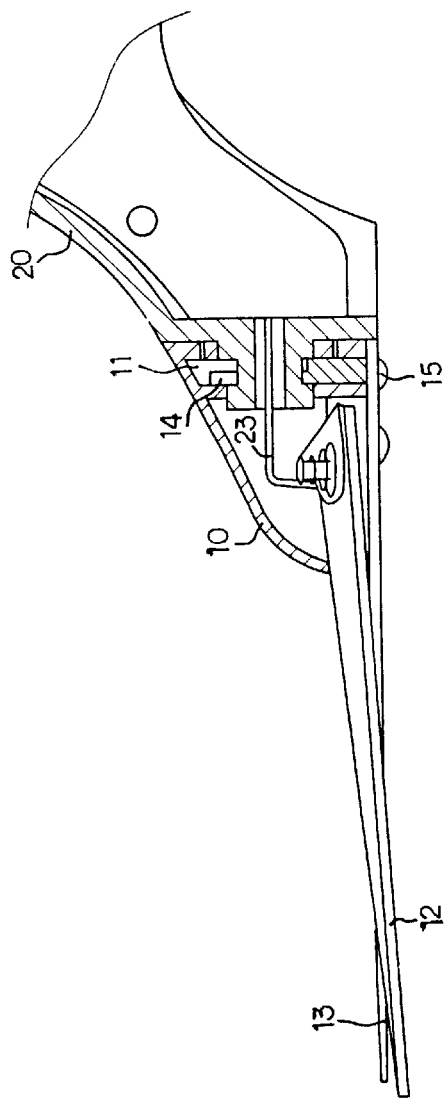
FIG. 2 is a sectional view of the present invention.
Figure 5:
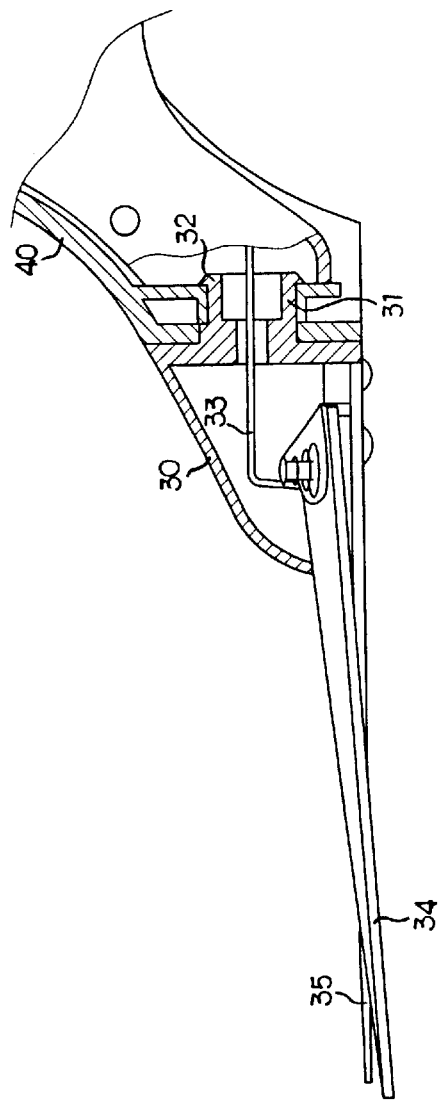
FIG. 5 is sectional view of the prior art scissors for cutting grass.
Figure 3:
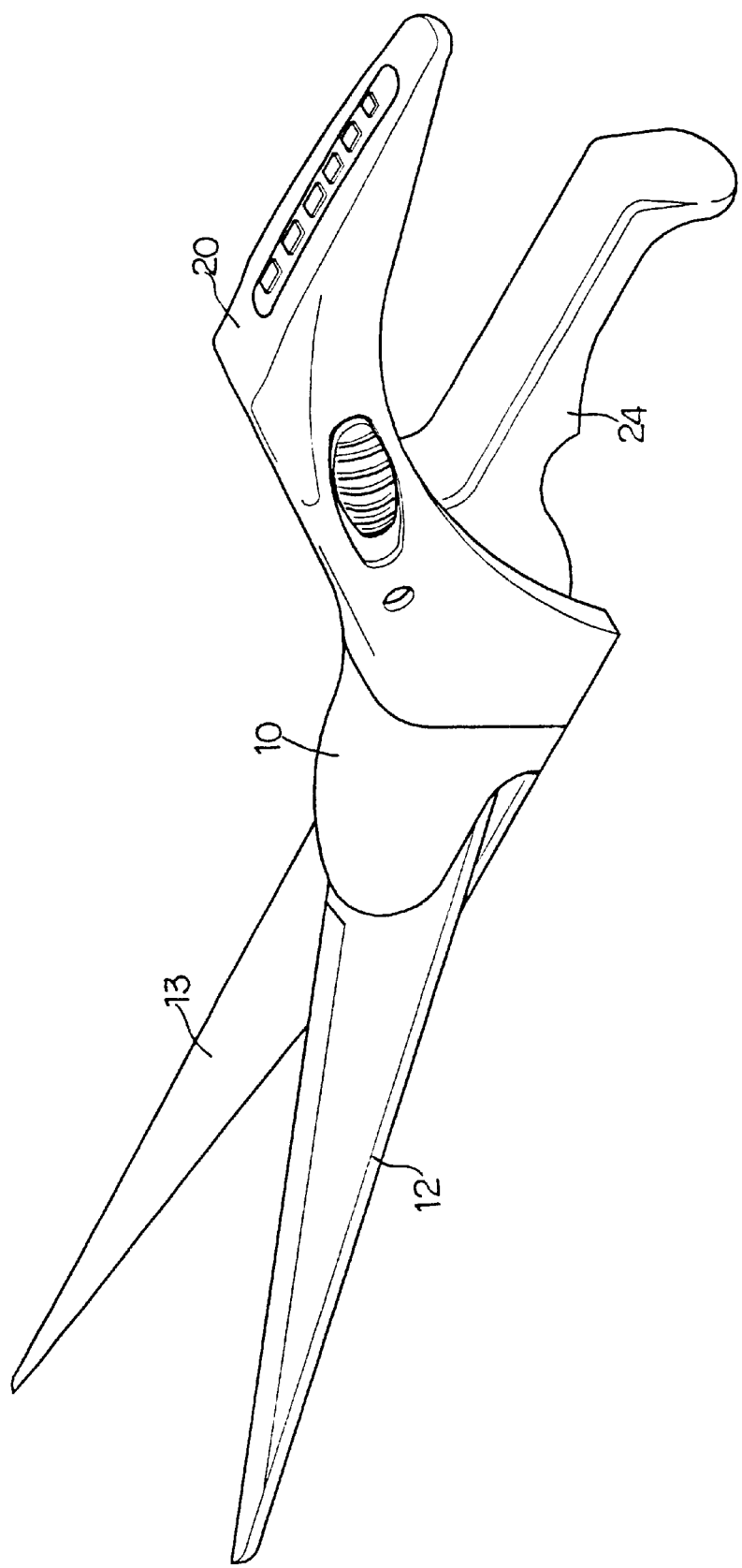
FIG. 3 is a perspective view of the present invention.
Figure 4:
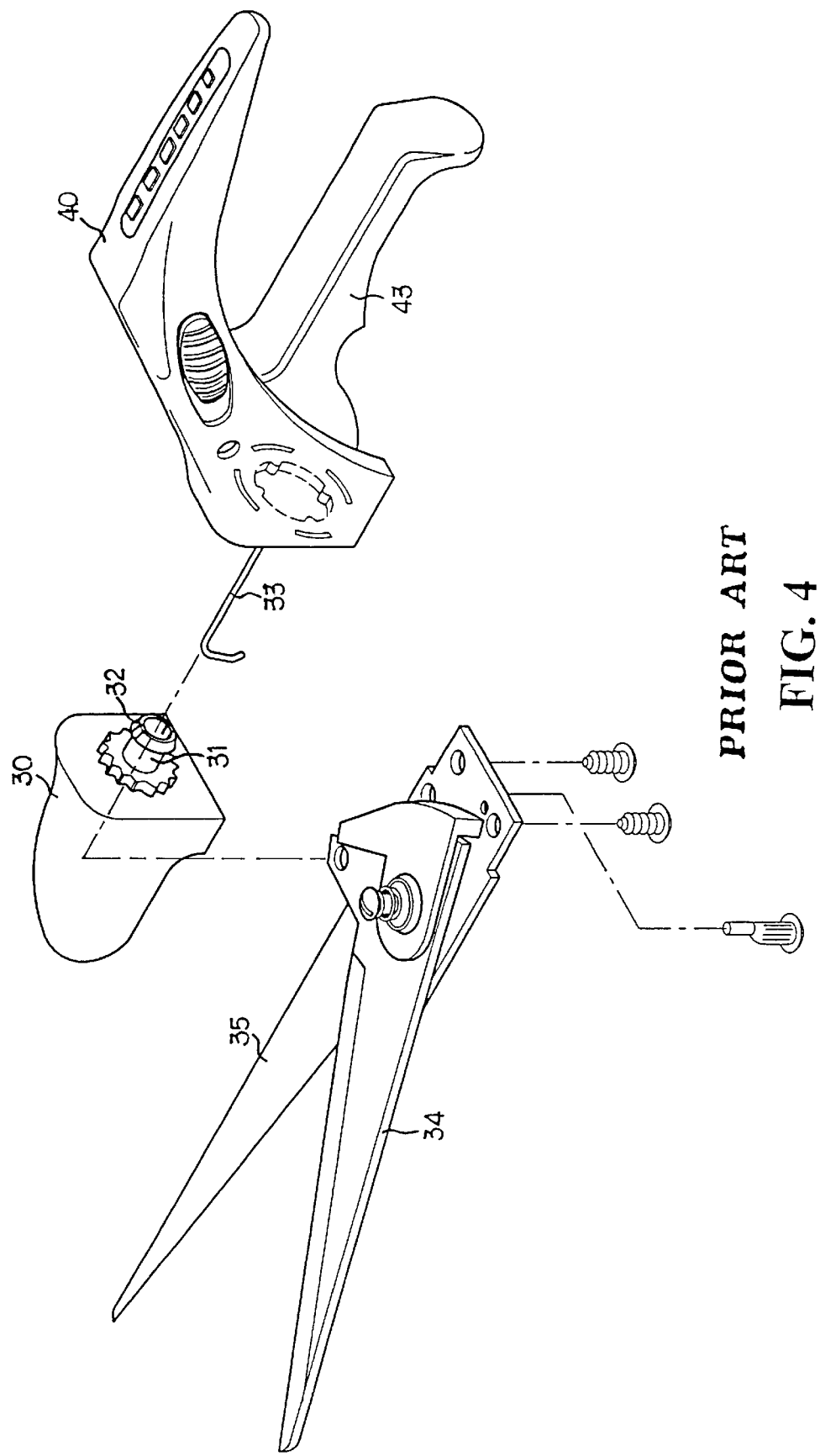
FIG. 4 is an exploded view of prior art scissors for cutting grass.

With reference to the drawings and in particular to FIGS. 1, 2 and 3 thereof, the scissors according to the present invention generally comprises a head 10, a main body 20, a handle 24, a linking wire 23, a positioning member 14, a movable blade 12 and a stationary blade 13. The head 10 is formed with an opening 101 at an inner end and a recess 11 at the interior (see FIGS. 1 and 2). The opening 101 is formed with a plurality of internal teeth. The handle 24 is pivotally connected with the main body 20 by a rivet or the like. An end of the main body 20 is provided with a cylindrical member 21 having a neck at an intermediate portion and a geared portion at an inner portion. The cylindrical member 21 has an axial hole 22 for the passage of the linking wire 23 into the handle 24. The other end of the linking wire 23 extends into the head 10 to connect with the movable blade 12, so that the handle 24 can be used for operating the movable blade 12. The stationary blade 13 is pivotally connected with the movable blade 12 by a rivet or the like. In assembly, the cylindrical member 21 is inserted into the head 10 and the geared portion 25 is engaged with the inner teeth of the opening 101 thereby keeping the head 10 in a fixed position. Then, the positioning member 14 which has a U-shaped recess at the top is inserted between the head 10 and the main body 20 to engage with the smaller diameter of the stepped cylindrical member 21. The inner end of the stationary blade 13 is directly locked on the bottom of the head 10 by screws 15 thereby covering the bottom of the positioning member 14 and therefore keeping the positioning member 14 in place.

When desired to dismantle the scissors for maintenance, it is only necessary to loosen the screws to remove the stationary blade 13 and then take out the positioning member 14 thereby enabling the head 10 from disengaging from the main body 20. As a consequence, the blades 12 and 13 can be easily disengaged from the scissors for sharpening or easily replaced with new ones so that the user has no need to throw away the whole scissors. Furthermore, when there is something wrong with the assembly of the scissors, the head 10 can be easily disengaged from the main body 20 for adjustment.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. Scissors for cutting grass comprising:

a head having an end formed with an opening having a plurality of internal teeth;

a main body provided with a cylindrical member having a neck at an intermediate portion and a geared portion at an inner portion, said main body being engaged with said head with said cylindrical member fitted into said opening;

a handle pivotally connected with said main body;

a positioning member inserted between said head and said main body;

a linking wire having an end inserted through said cylindrical member to connect with said handle;

a movable blade having an end connected with another end of said linking wire; and a stationary blade pivotally connected with said movable blade and mounted on a bottom of said head by screws.

2. Scissors for cutting grass as claimed in claim 1, wherein said positioning member has a top formed with a U-shaped recess.

* * * * *